US012315257B2

(12) United States Patent
Betka et al.

(10) Patent No.: US 12,315,257 B2
(45) Date of Patent: May 27, 2025

(54) SYSTEM AND METHOD FOR IDENTIFYING HUMAN INTERACTION LIMITATIONS BASED ON HISTORICAL INFORMATION

(71) Applicant: MOTOROLA SOLUTIONS, INC., Chicago, IL (US)

(72) Inventors: Robert Betka, Cracow (PL); Grzegorz Szurek, Cracow (PL); Katarzyna B. Rugiello, Krosno (PL); Jakub Kleszcz, Klecza Dolna (PL); Oliwia Strzelec, Warsaw (PL)

(73) Assignee: MOTOROLA SOLUTIONS INC., Chicago, IL (US)

( * ) Notice: Subject to any disclaimer, the term of this patent is extended or adjusted under 35 U.S.C. 154(b) by 338 days.

(21) Appl. No.: 17/815,239

(22) Filed: Jul. 27, 2022

(65) Prior Publication Data

US 2024/0037947 A1     Feb. 1, 2024

(51) Int. Cl.
*G08B 21/02*     (2006.01)
*G06V 20/40*     (2022.01)
*G06V 40/10*     (2022.01)

(52) U.S. Cl.
CPC .............. *G06V 20/46* (2022.01); *G06V 40/10* (2022.01); *G08B 21/02* (2013.01)

(58) Field of Classification Search
CPC ...... G06V 20/46; G06V 40/10; G06V 40/172; G06V 20/52; G08B 21/02
See application file for complete search history.

(56) References Cited

U.S. PATENT DOCUMENTS

| | | | |
|---|---|---|---|
| 9,232,040 B2 * | 1/2016 | Barash | G08B 25/016 |
| 10,004,431 B2 | 6/2018 | Shuster et al. | |
| 10,037,458 B1 | 7/2018 | Mahmoud et al. | |
| 10,038,783 B2 | 7/2018 | Wilcox et al. | |
| 10,298,875 B2 | 5/2019 | Klein et al. | |
| 10,496,887 B2 | 12/2019 | Ernesti et al. | |
| 10,687,751 B2 | 6/2020 | Wall | |
| 11,475,983 B2 * | 10/2022 | Robbins | G16H 20/00 |
| 2023/0128090 A1 * | 4/2023 | Kaftarian | G16H 40/67 |
| | | | 705/2 |

FOREIGN PATENT DOCUMENTS

EP         2771863 B1     7/2020

* cited by examiner

*Primary Examiner* — Stephen R Koziol
*Assistant Examiner* — Dylan J Sherrillo (57) ABSTRACT

Techniques for identifying human interaction limitations based on historical information are provided. An indication of a public safety incident is received. The public safety incident involves at least one person and occurs at an incident location. Historical video of the incident location is acquired. The historical video of the incident location is analyzed to identify the presence of the at least one person. A behavior of the at least one person in the historical video of the incident location is analyzed to identify at least one human interaction limitation. A first responder that is responding to the public safety incident is informed of the at least one human interaction limitation.

20 Claims, 4 Drawing Sheets

SYSTEM AND METHOD FOR IDENTIFYING HUMAN INTERACTION LIMITATIONS BASED ON HISTORICAL INFORMATION

BACKGROUND

In today's world surveillance cameras have become ubiquitous. In many urban areas, it is likely that a person on a public street is having their image captured by multiple cameras. The use of surveillance cameras is also expanding in the private sector. For example, many businesses have surveillance cameras to protect their business from situations such as theft, etc. The presence of cameras in private residences is also increasing. Cameras, such as doorbell cameras, are becoming increasingly common.

The ubiquitous nature of such cameras has provided a great benefit to public safety personnel. In many cases, access to the video streams of such cameras is made available in real time to public safety personnel, such as 911 call takers. When a 911 emergency call is received, a 911 call taker may be able to identify surveillance cameras whose field of view includes the location where the incident being reported in the 911 call is occurring. The call taker may then bring up a live video feed of the location to assist in dispatching appropriate personnel to respond to the 911 call.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

When public safety personnel, such as law enforcement officers, are dispatched to respond to an incident being reported in a 911 call, the information available may consist of the information being reported by the 911 caller and information that the 911 call taker may determine from viewing the real time video of the incident scene. A problem may arise when an officer arrives on scene and expects a subject of the 911 call to behave in a certain way and the subject does not comply. In some cases, the subject may not comply due to a human interaction limitation that the officer is not aware of.

For example, a 911 call may be received about a subject acting incoherently in a public park causing a disturbance. The 911 dispatcher may view real time video footage of the subject and relay the actions of the subject to a responding officer. Upon arrival, at the incident scene, the officer may command the subject to lie down. If the subject does not comply, this could lead to an escalation, potentially including the use of physical force. Continued non-compliance could result in escalation of the amount of force used, up to and including lethal force.

A problem arises when the subject, through one or more human interaction limitations, is unable to comply with the officer's commands. For example, in the scenario described above, the subject may be impaired (e.g. inebriated, low blood glucose, stroke, etc.) such that they are unable to understand the officer's commands. If they are unable to understand the commands, the subject would clearly be unable to comply with those commands.

The techniques described herein solve this problem and others by retrieving historical video of an incident location when a 911 call is received. The historical video can be analyzed to determine if the subject is present in the video and if there is any indication that they are engaged in an activity that could limit their human interaction capabilities. For example, if historical video of the public park is analyzed and the subject is identified, it may be determined what activity the subject is engaged in. For example, if the historical video shows the suspect drinking alcohol from a bottle in the 10 minutes prior to the 911 call, it may be assumed the subject is inebriated and may have difficulty complying with commands. It should be noted that this determination may be made despite neither the responding officer nor the 911 call taker having actually seen the subject drinking.

In addition, once the subject has been identified, historical video of the subject taken from a location different than the 911 incident location may be retrieved and analyzed to identify human interaction limitations. For example, once the subject is identified, historical video of the subject may be retrieved from various sources (e.g. social media, video sharing sites, etc.) to identify human interaction limitations. For example, if a retrieved video shows the subject communicating via sign language, it can be determined that the subject might be deaf and would be unable to respond to verbal commands.

Once any human interaction limitations are identified, those limitations could be communicated to the responding officer and further utilized to tailor the officers response to the individual subject. For example, if it is determined the subject is inebriated, the officer may choose to speak in a lower tone of voice, use simple words, and speak slowly. In the case of a subject with low blood sugar, the officer may respond by requesting medical assistance and treating the response as a medical emergency rather than a non-compliant subject. In the case of a deaf subject, the officer may provide commands using nonverbal techniques (sign language, writing commands down on paper, etc.).

A method is provided. The method includes receiving an indication of a public safety incident, the public safety incident involving at least one person, the public safety incident occurring at an incident location. The method also includes acquiring historical video of the incident location. The method also includes analyzing the historical video of the incident location to identify a presence of the at least one person. The method also includes analyzing a behavior of the at least one person in the historical video of the incident location to identify at least one human interaction limitation. The method also includes informing a first responder that is responding to the public safety incident of the at least one human interaction limitation.

In one aspect, the human interaction limitation is related to the at least one person's communication abilities. In one aspect, the human interaction limitation is at least one of an inebriated person, a hearing impaired person, and an autistic person. In one aspect, the human interaction limitation is related to the at least one person's physical movement abilities.

The method also includes acquiring historical video of the at least one person taken from a location different from the incident location and analyzing the behavior of the at least one person in the historical video of the location different from the incident location to identify at least one human interaction limitation. In one aspect, the historical video is limited to a configurable time threshold. In one aspect, the threshold is based on a length of time the at least one human interaction limitation is expected to persist.

A system is provided. The system includes a processor and a memory coupled to the processor, the memory containing a set of instructions thereon that when executed by the processor cause the processor to receive an indication of a public safety incident, the public safety incident involving at least one person, the public safety incident occurring at an incident location. The instructions further cause the processor to acquire historical video of the incident location. The instructions further cause the processor to analyze the historical video of the incident location to identify a presence of the at least one person. The instructions further cause the processor to analyze a behavior of the at least one person in the historical video of the incident location to identify at least one human interaction limitation. The instructions further cause the processor to inform a first responder that is responding to the public safety incident of the at least one human interaction limitation.

In one aspect, the human interaction limitation is related to the at least one person's communication abilities. In one aspect, the human interaction limitation is at least one of an inebriated person, a hearing impaired person, and an autistic person. In one aspect, the human interaction limitation is related to the at least one person's physical movement abilities.

The memory also includes instructions that cause the processor to acquire historical video of the at least one person taken from a location different from the incident location and analyze the behavior of the at least one person in the historical video of the location different from the incident location to identify at least one human interaction limitation. In one aspect, the historical video is limited to a configurable time threshold. In one aspect, the threshold is based on a length of time the at least one human interaction limitation is expected to persist.

A non-transitory processor readable medium containing a set of instructions thereon is provided. The instructions on the medium, that when executed by a processor, cause the processor to receive an indication of a public safety incident, the public safety incident involving at least one person, the public safety incident occurring at an incident location. The instructions on the medium further cause the processor to acquire historical video of the incident location. The instructions on the medium further cause the processor to analyze the historical video of the incident location to identify a presence of the at least one person. The instructions on the medium further cause the processor to analyze a behavior of the at least one person in the historical video of the incident location to identify at least one human interaction limitation. The instructions on the medium further cause the processor to inform a first responder that is responding to the public safety incident of the at least one human interaction limitation.

In one aspect, the human interaction limitation is related to the at least one person's communication abilities. In one aspect, the human interaction limitation is at least one of an inebriated person, a hearing impaired person, and an autistic person.

The non-transitory processor readable medium further comprises instructions that cause the processor to acquire historical video of the at least one person taken from a location different from the incident location and analyze the behavior of the at least one person in the historical video of the location different from the incident location to identify at least one human interaction limitation. In one aspect, the historical video is limited to a configurable time threshold. In one aspect, the threshold is based on a length of time the at least one human interaction limitation is expected to persist.

Further advantages and features consistent with this disclosure will be set forth in the following detailed description, with reference to the figures.

Figure 1:
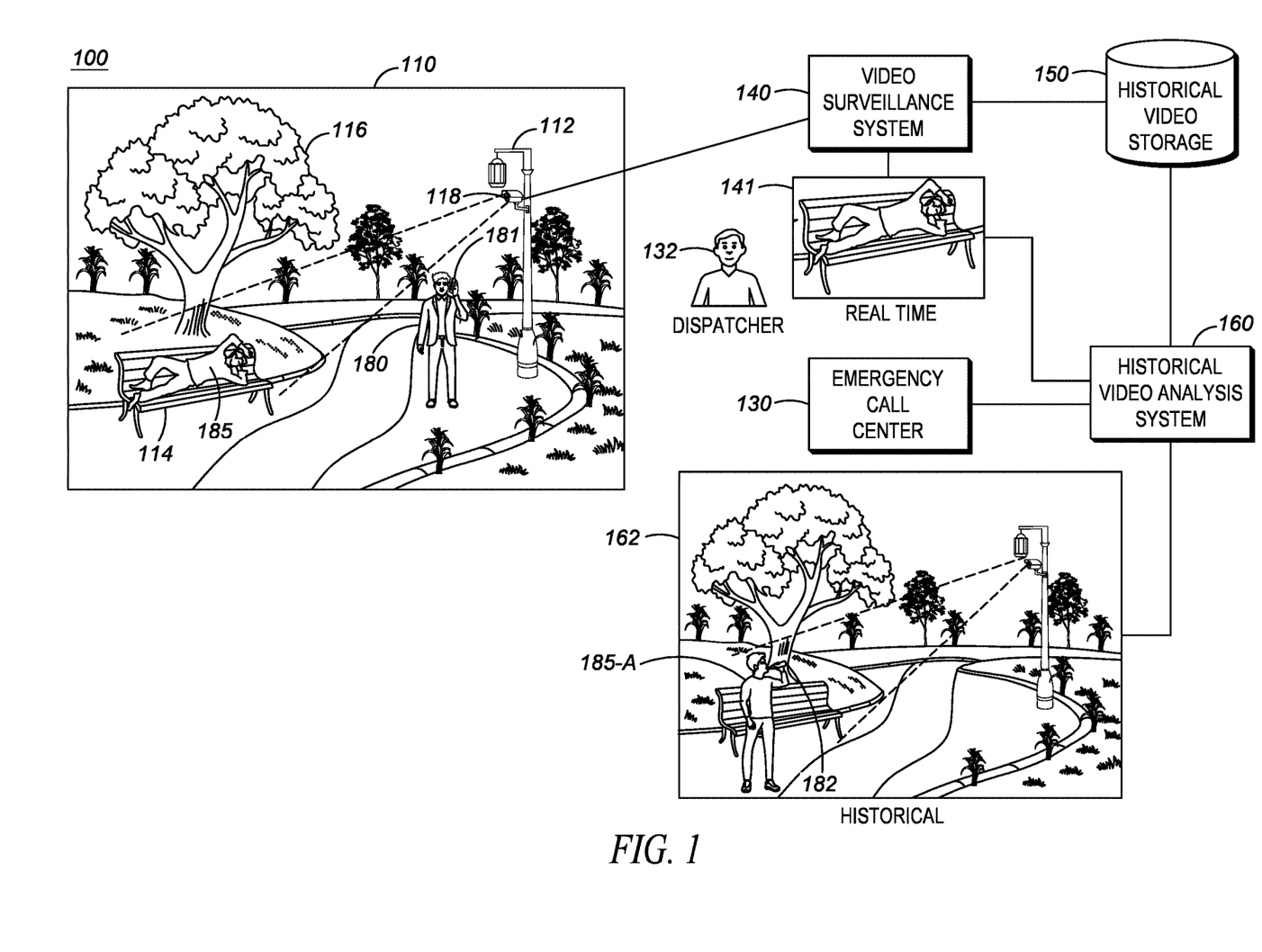
FIG. 1 is an example environment in which human interaction limitations may be determined using historical information of an incident location.

FIG. 1 is an example environment 100 in which human interaction limitations may be determined using historical information of an incident location. FIG. 1 depicts an incident scene 110, which in this example is shown as a park. The park may include a sidewalk, a streetlight 112, a bench 114, and a tree 116. Attached to the streetlight 112 may be a surveillance camera 118 whose field of view includes the bench 114. It should be understood that this example, environment is for purposes of description only and should not be considered limiting. In general, what should be understood is that there may be a location where an incident occurs, and that location is within the field of view of one or more cameras.

The surveillance camera 118 may be coupled to a video surveillance system 140. Although only a single camera is shown, it should be understood that the video surveillance system 140 may be coupled to any number of cameras. The video surveillance system 140 may also be coupled to a historical video storage system 150. The historical video storage system 150 may store video captured by cameras associated with the video surveillance system 140 such that they can be retrieved at a later time. In addition, the historical video storage system 150 may store video from locations other than the incident location.

The historical video storage system 150 may also store video from locations and sources other than the video surveillance system 140. For example, the videos may be social media videos, video sharing website videos, public file repositories, etc. What should be understood is that historical video storage 150 is not intended to describe any singular storage system, but is intended to include any source from which historical video (e.g. video of past timeframes) of any location may be retrieved. The historical video storage system 150 may include video obtained through social media sites, file sharing sites, video sharing sites, etc. What should be understood is that the historical video storage system 150 represents any source of historical (e.g. non real time) video.

The environment 100 may also include an emergency call center 130 where calls to an emergency number (e.g. 911, 112, 999, etc.) may be received. Such a center may also be known as a Public Safety Answering Point (PSAP). A dispatcher/call taker 132 may receive calls at the emergency call center 130 that indicates a public safety incident has occurred. It should be noted that incident is being used to describe a situation where a response by a public safety first responder is being requested, rather than being limited to situations in which an actual emergency (e.g. danger to life, etc.) is in progress. The dispatcher 132 may dispatch one or more first responders to the incident scene 110 to address the public safety incident.

The environment 100 may also include a historical video analysis system 160 that may be used to analyze historical video to identify human interaction limitations. As will be described in further detail below, the historical video analysis system 160 may retrieve video from the historical video storage system to identify at least one person that is involved in a current incident. Based on an analysis of the identified person's behavior in the historical video, it may be determined if the identified person has any human interaction limitations. An example of a hardware device that may implement the historical video analysis system 160 is described with respect to FIG. 4.

Operation of the environment 100 will now be described in further detail by way of an example scenario. In operation, a person 180 may be walking through the park 110 on the sidewalk. The person 180 may notice a person in distress 185 lying on the bench 114 is unresponsive. Out of concern for the distressed individual 185, the person 180 may use a communications device 181 (e.g. cell phone, etc.) to place an emergency call to the emergency call center 130 to request assistance from first responders.

The dispatcher/call taker 132 of the emergency call center may get information from the person 180 related to the incident (e.g. person 185 in distress) including the location of the incident. In some cases, the location information may be transmitted automatically, (e.g. E-911, etc.) while in other cases the location information may be provided manually by the person 180 who is reporting the incident.

The dispatcher 132 may then access the video surveillance system 140 to determine if there are any cameras whose field of view includes the incident location 110. In this example, assume that camera 118 has a field of view that covers the bench 114 where the incident is occurring. The dispatcher 132 may view real time video 141 of the incident scene to determine what is currently going on in order to aid in the response.

The real time video 141 may also be sent to the historical video analysis system to identify at least one person involved in the public safety incident. In this example, the at least one person may be the person in distress 185 that is laying on the bench 114 unresponsive. The person does not need to be personally identified (e.g. by name, etc.) but rather only needs to be identified to the extent needed to identify the same person in historical video. For example, the person may be identified by a combination of sex, appearance (e.g. clothing color, type, etc.) hair style, or any other type of identification that would be usable to identify the same person in different videos. In some implementations, facial recognition may be used to identify the same person in different videos, however it should be understood that this does not necessarily require identification of the person (e.g. by name, etc.) but rather could be limited to simply indicate the same person was seen in different videos. The techniques described herein are not limited to any particular mechanism for identifying that the same person appears in different videos, and any currently available or later developed techniques would be suitable.

Once the at least one person associated with the incident is determined, the historical video analysis system 160 may access the historical video storage 150 to acquire historical video of the incident location 110. The historical video may be limited to a certain configurable time period, such as 5 minutes prior, 1 hour prior, 1 day prior, etc. The use of the configurable time period is described in further detail below.

In the present example, the historical video analysis system 160 may have identified the at least one person in historical video 162. For example, the video may have been from 30 minutes prior to person 180 making the emergency call. The historical video analysis system 160 may use behavioral analytics to identify that the person 185-*a* in the historical video appears to be drinking alcohol from a bottle 182. As such, the historical video analysis system 160 may make a determination that the person 185-*a* (and by extension person 185) is possibly inebriated. The fact the person 185 may possibly be inebriated may be relayed to a first responder responding to the incident (not shown) by either the historical video analysis system 160 or the dispatcher 132. It should be noted that there are many known video analytics techniques to identify behavior in a video. The techniques described herein are usable with any video analytics techniques used to identify behavior that are either currently available or will be developed in the future.

It is well known that an inebriated person may have human interaction limitations, such as the inability to listen to and understand complex commands, the inability to clearly speak, the inability to control bodily movements, etc. The first responder may alter his course of action based on these human interaction limitations. For example, instead of initially shouting commands to get off the bench 114, for which non-compliance could result in incident escalation, the first responder may first check that person 185 has not simply passed out from excessive alcohol consumption. In other words, the first responders response could be tailored based on the human interaction limitations that were identified.

In a modification of the above example, assume that the behavior in the historical video 162 shows the person 185-*a* exhibiting behavior that is often associated with a condition such as autism (e.g. rhythmic rocking back and forth). The system may identify the person as possibly being autistic. In some cases, an autistic person may have a human interaction limitation that causes difficulty in responding to commands. If the first responder is informed the person 185 may be autistic, the first responder may alter their approach to the person 185.

In some cases, the behavior in the historical video 162 may cause a completely different response For example, assume the historical video 162 is analyzed to determine that person 185 has had a seizure. A common after effect of a seizure is the afflicted person becomes unresponsive. As such, the human interaction limitation is that the person 185 would not be responsive at all, regardless of the first responders actions. In such cases, the first responder may simply request emergency medical services rather that attempt to communicate with the person 185 at all.

It should be noted that although the previous example has been presented in terms of a person calling an emergency call center to trigger the analysis, the techniques are not so limited. In some cases, a first responder (e.g. a law enforcement officer on patrol, etc.) may come across an incident, rather than being dispatched to the incident. A very similar process may occur in that the first responder notifies the dispatcher of the incident, and then the same process occurs (e.g. getting real time video, identify the at least one, analyzing behavior of the person in historical video, etc.).

It should further be noted that in the above presented examples, the dispatcher/call taker 132 does not view the historical video. Instead, the historical video analysis system 160 uses video analytics to identify the behaviors that are exhibited, and from those behaviors associates the person exhibiting those behaviors with a human interaction limitation.

Figure 2:
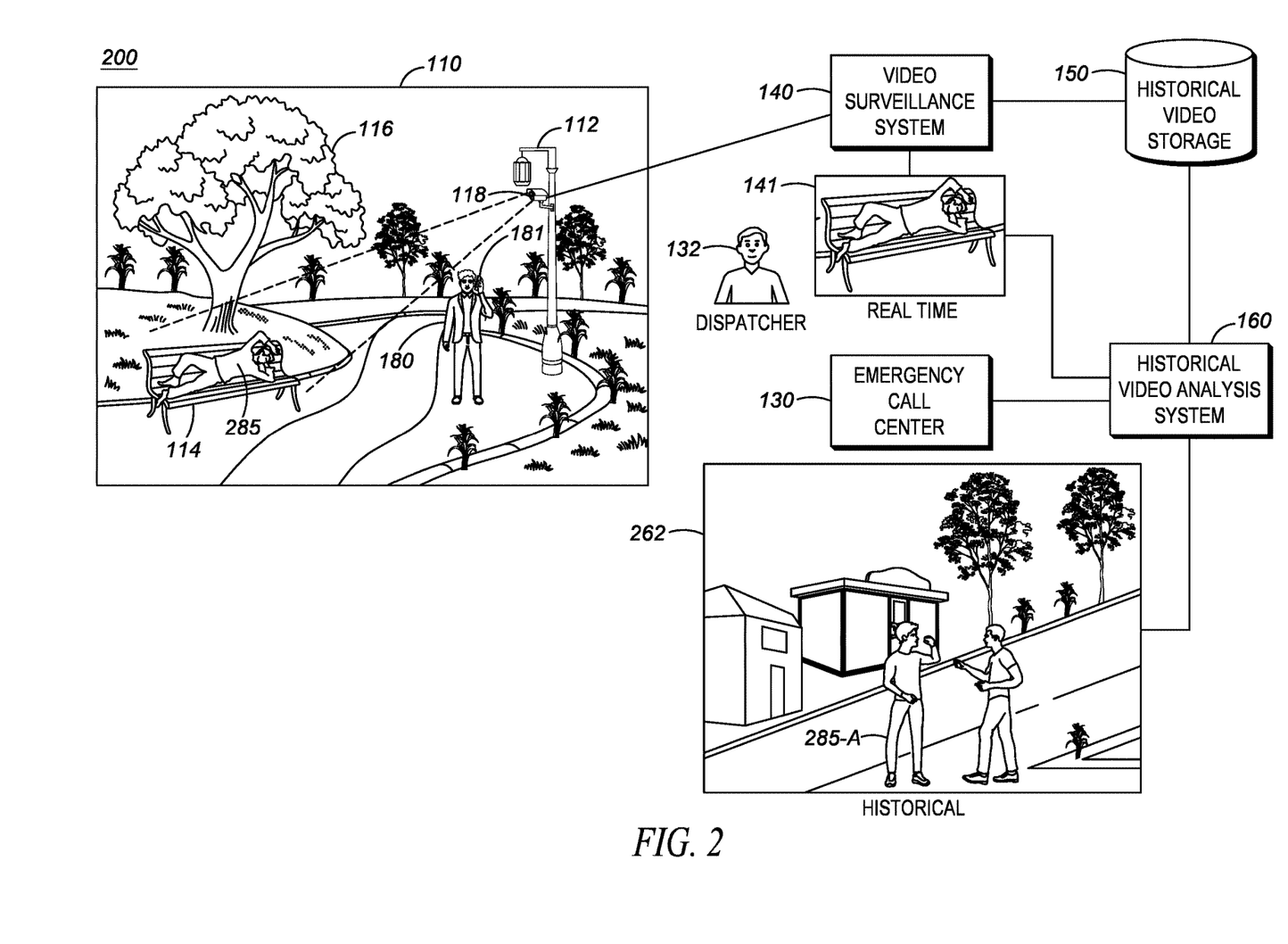
FIG. 2 is an example environment in which human interaction limitations may be determined using historical information of a location different than the incident location.

FIG. 2 is an example environment 200 in which human interaction limitations may be determined using historical information of a location different than the incident location. FIG. 2 depicts an environment that is essentially the same as that described with respect to FIG. 1. However the difference in FIG. 2 is that the historical video analysis system also retrieves video from a location different than the incident location.

Just as above, operation of environment 200 will be described by way of example. Assume that the same scenario has occurred and that person 180 has made an emergency call reporting unresponsive person 285. The same steps occur up until the time that historical video is acquired by the historical video analysis system 160. For example, rather than retrieving historical video from the incident location, the historical video from a different location could be acquired. For example, once the person is identified, social media posts including the person could be acquired. Behavior in those videos of different locations could be used to identify human interaction limitations.

For example, historical video 262 may have been acquired from a social media posting and depicts the person 285-a engaging in a sign language conversation. As such, this may indicate that the person is hearing impaired and that this would present a human interaction limitation in that verbal commands to the person 285 would possibly not be heard. Upon being informed that the person 285 may be hearing impaired, the first responder may take a different course of action as they are aware that the person 185 may be limited in their ability to follow audio commands.

The retrieval of historical video, in particular the retrieval of historical video from locations other than the incident locations may be subject to time thresholds, as the human interaction limitation may be a transient event. For example, in the case of the hearing impaired person, the time threshold could be greater (e.g. weeks, months, etc.) because it is quite likely that the human interaction limitation brought about by the hearing impairment would not be a transient condition. Thus, even old historical video indicating such a human interaction limitation would be useful. On the other hand, some human interaction limitations may be relatively transient. For example, historical video of a person drinking alcohol 3 days ago is likely to be less relevant to a person being inebriated today.

When analyzing the human behaviors in the historical video, the nature of the behavior is taken into account when setting thresholds for how far into the past historical video is acquired. For conditions that are expected to be persistent, older historical video may be used, and the threshold set higher. Whereas for conditions that are expected to be transient, the threshold may be set lower, to ensure that more recently historical video is considered, while omitting video whose content is less likely to be relevant to current human interaction limitations.

Figure 3:
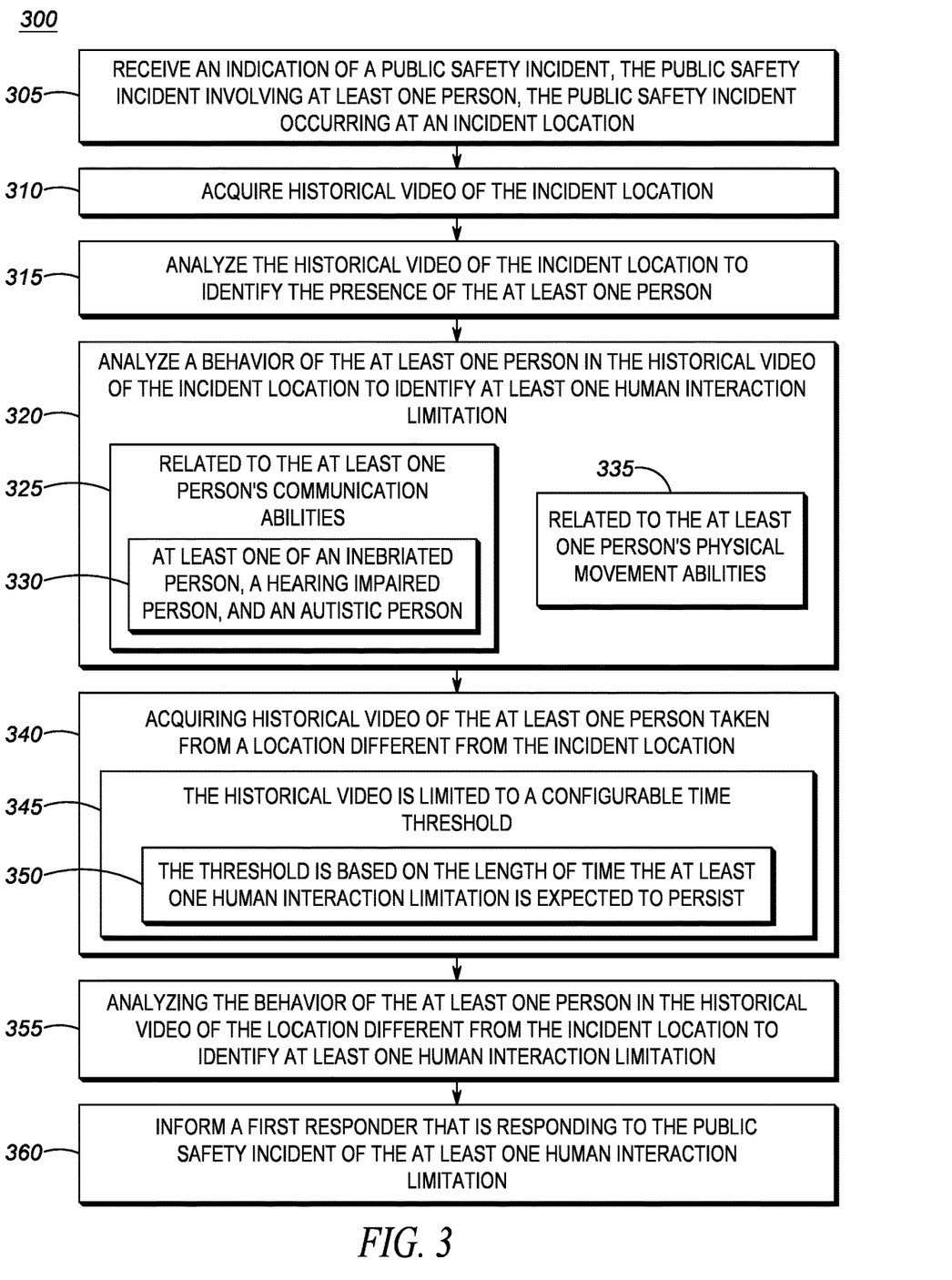
FIG. 3 is an example flow diagram for implementing the identifying human interaction limitations based on historical information techniques described herein.

FIG. 3 is an example flow diagram 300 for implementing the identifying human interaction limitations based on historical information techniques described herein. In block 305, an indication of a public safety incident may be received. The public safety incident may involve at least one person. The public safety incident may occur at an incident location. For example, a common form of receiving an indication of a public safety incident may be an incident reporter, such as a witness, calling an emergency number (e.g. 911, 112, 999, etc.) to report some form of public safety incident. The incident may be criminal in nature (e.g. robbery, assault, etc.), health safety related (e.g. heart attack, seizure, etc.), or any other type of incident that may be reported to a public safety agency.

The incident may involve at least one person. For example in the case of a criminal incident, the at least one person may be a suspect. In the case of a medical emergency, the at least one person may be a patient. The incident may occur at a specific location. For example, the location where assistance is being requested. In the case of a criminal incident, the location may be where the crime was committed. In the case of a medical incident, the location may be where emergency medical services are being requested. It should be understood that these are merely examples of a mechanism for receiving an indication of a public safety incident. Other examples may include a witness arriving at a public safety facility (e.g. police station, fire station, etc.), an indication sent via text message, an indication sent via email, etc. What should be understood is that an indication of a public safety incident is received, regardless of how that indication is received. The incident involves at least one person and the incident occurs at a location.

In block 310, historical video of the incident location may be acquired. As explained above, the presence of security cameras of many different types has become ubiquitous. Once the indication of the location of the incident is received, it can be determined if there are any cameras that cover the incident location. If there are cameras that cover the incident location, historical footage from those cameras may be acquired. Historical footage may include periods of time prior to the receipt of the indication of the public safety incident. For example, the footage for a time period (e.g. 5 minutes, 1 hour, 1 day, etc.) immediately prior to the receipt of the public safety incident indication may be acquired. It is well known to store footage from security cameras in any number of different ways (e.g. raw data files, databases, etc.). Acquiring such footage from storage facilities would be well within the capabilities of a person of skill in the art. The specific techniques used would be dependent on the particular storage facility in use, and the techniques described herein are usable with any currently available or later developed storage techniques.

In block 315, the historical video of the incident location is analyzed to identify the presence of the at least one person. For example, as described above, real time video of the incident location may be sent to public safety personnel (e.g. 911 call taker, etc.) handling the indication of the public safety incident (e.g. the 911 call). For this video, at least one person may be identified as the person of interest. For example, in the case of a medical emergency, the at least one person may be a subject who is in medical distress. In the case of a disorderly person, the at least one person may be the cause of the disorder.

The historical video is analyzed to determine if that at least one person was present at the incident scene prior to the indication of a public safety incident being sent. In other words, it is determined if the subject of the public safety incident was at the incident location for some period of time prior to the public safety incident occurring. The techniques described herein are not dependent on any specific mechanism for identifying the at least one person. For example, in some implementations non-identifying facial recognition (e.g. facial recognition that does not personally identify an individual) may be used to match the person in the real time video viewed by the 911 call taker to the historical video. In other implementations, the person's appearance (e.g. clothing color, sex, height, etc.) may be used. The specific techniques used to identify the person in the historical video is relatively unimportant, and any currently available or later developed technique would be usable with the techniques described herein.

In block 320, a behavior of the at least one person in the historical video of the incident location is analyzed to identify at least one human interaction limitation. As described above, a human interaction limitation is any type of limitation that would prevent the at least one person from behaving as would be expected. This may be due to an inherent physical limitation of the person, a self-induced condition, a sudden onset condition, etc.

For example, in block 325, the at least one human interaction limitation may be related to the at least one person's communication abilities. For example, the person may not be able to communicate with an arriving first responder in a typical manner. In block 330, several example human interaction limitations, such as an inebriated person, a hearing impaired person, or an autistic person may be identified. In block 335, the at least one human interaction limitation may be related to the at least one person's physical movement abilities.

The historical video may be processed by video analytics to identify the activity that the at least one person is engaged in. For example, the analytics may determine that the at least one person was drinking what appears to be alcohol, and that the person may be inebriated. In another example, the historical video may show that the at least one person is communicating via sign language, which is an indication that the person may be deaf and unable to communicate via sound. In yet another example, the at least one person may be displaying movements sometimes associated with people with autism (e.g. rocking back and forth, etc.). In yet another example, the at least one person may be displaying movements that indicate a limitation in the movement abilities of the person. For example, the person may repeatedly attempt to standup, but then immediately falls down. This may be an indication that the person has limited motor functions.

What should be understood is that these limitations are determined by analytics that are processing the historical video. These same actions may not be occurring in the real time video being viewed by the 911 call taker, and as such, the 911 call taker is not aware of those actions. For example, the at least one person may be a disorderly person and at the time 911 is called, the person is no longer actively drinking. As such, the person is not shown as drinking in the real time video that may be viewed by the 911 call taker. The historical video may be analyzed using any currently available or later developed analytics techniques that are capable of identifying the actions of the at least one person. The techniques described herein are not dependent on any particular analytics technique.

In block 340, historical video of the at least one person taken from a location different from the incident location may be acquired. As will be explained below, a similar analysis that was done in block 320 may be done on the video acquired from a location different than the incident location. The source of the video can be any known source, such as social media sites, file sharing sites, video upload sites, public domain cameras, etc. What should be understood is that historical video that includes the at least one person from locations different than the incident location may be acquired.

In block 345, the retrieval of the historical video is limited to a configurable time threshold. For example, historical video from different locations may be configured to only include video that is no older than a configured time period (e.g. 1 hour, 1 day, 1 week, etc.). This limitation may ensure that only video that is relatively recent and could conceivably have an impact on identifying human interaction limitations. In block 350, the threshold is based on the length of time the at least one human interaction limitation is expected to persist.

For example, for a condition where the at least one person may be drinking, historical video from a week ago showing the person drinking may not be useful, as it is unlikely the person is still inebriated a week later. Thus, the threshold may be limited to a much shorter period of time (e.g. 1 day). On the other hand, if the at least one person is deaf and uses sign language, it is unlikely this was a sudden onset condition. As such, the threshold could be set to be longer (e.g. 1 week) as it is likely that if the person was deaf 1 week ago, it is highly likely they are still deaf at present. What should be understood is that the threshold may be set such that it is likely that any human interaction limitation identified in the historical video from a different location would likely still be present at the time of the indication of the public safety incident.

In block 355, the behavior of the at least one person in the historical video of the location different from the incident location may be analyzed to identify at least one human interaction limitation. Just as in block 320, video analytics may be used to identify human interaction limitations. As explained with respect to blocks 345, 350 the historical video of the different location is selected with a time threshold such that any identified human interaction limitation would still exist at the time of the indication of the public safety incident.

In block 360, a first responder that is responding to the public safety incident may be informed of the at least one human interaction limitation. For example, in the case where the person is inebriated, the first responder may alter his behavior such that commands are given at a slower pace using simple language that would be more readily understood by an inebriated person. As another example, if it is determined that the person is deaf, the first responder may communicate using non-verbal commands (e.g. hand gestures, etc.). As yet another example, in a case where it is determined that the person just had a seizure and is postictal (e.g. altered mental state brought on by seizure), the first responder may not attempt to communicate with the person at all, but rather may summon emergency medical services. What should be understood is that the first responder is informed of the human interaction limitation, and then may alter their actions accordingly.

Figure 4:
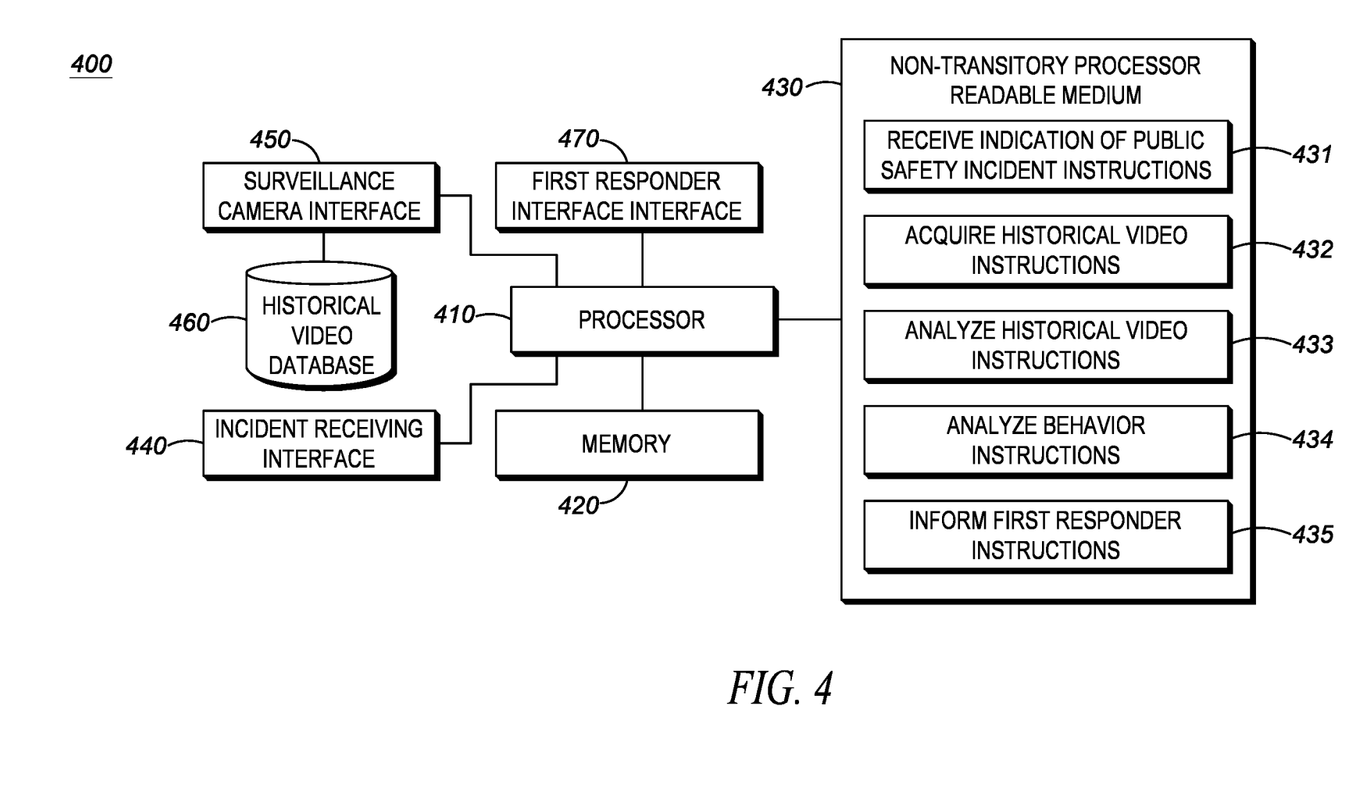
FIG. 4 is an example of a device that may implement the techniques described herein.

FIG. 4 is an example of a device 400 that may implement the identifying human interaction limitations based on historical information techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. retrieving historical video, analyzing behavior to detect human interaction limitations, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, incident receiving interface 440, surveillance camera interface 450, historical video interface 460, and first responder interface 470.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include receive indication of public safety incident instructions 431. The receive indication of public safety incident instructions 431 may cause the process to receive an indication of a public safety incident, for example through incident receiving interface 440. Incident receiving interface may be an interface to an emergency call handling system, such as a 911 call center. The receive indication of public safety incident instructions 431 may cause the processor to identify at least one person associated with the incident and the incident location. The instructions may further cause the processor to utilize the surveillance camera interface 450 to receive real time video of the incident location to aid in identifying the at least one person. The real time video may also be stored in historical video database 460 for later utilization. The receive indication of public safety incident instructions 431 are described throughout this description generally, including places such as the description of block 305.

The medium 430 may include acquire historical video instructions 432. The acquire historical video instructions 432 may cause the processor to retrieve video historical video of the incident location that includes the identified person as well as historical video of other locations that include the identified person. For example, the acquire historical video instructions 432 may cause the processor to access a historical video database 460 that includes stored historical video. The historical video database 460 may also include video from social media sites, file sharing sites, etc. The acquire historical video instructions 432 are described throughout this description generally, including places such as the description of blocks 310, and 340-350.

The medium 430 may include analyze historical video instructions 433. The analyze historical video instructions 433 may cause the processor to identify the at least one person associated with the incident from the real time video in the acquired historical video. The analyze historical video instructions 433 are described throughout this description generally, including places such as the description of blocks 315.

The medium 430 may include analyze behavior instructions 434. The analyze behavior instructions 434 may cause the processor to use video analytics to analyze the historical video to identify behaviors that could be associated with human interaction limitations. The analyze behavior instructions 434 are described throughout this description generally, including places such as the description of blocks 320-335, and 355.

The medium 430 may include inform first responder instructions 435. The inform first responder instructions 435 may cause the processor to inform a first responder of the human interaction limitation. For example, the processor may utilize the first responder interface 470 to communicate the human interaction limitation to a first responder. The first responder interface 470 could be an interface to a first responder radio communications system or any other suitable system. The inform first responder instructions 435 are described throughout this description generally, including places such as the description of block 360.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot retrieve historical video from various databases and use machine based video analytics to analyze behavior to identify human interaction limitations, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving an indication of a public safety incident, the public safety incident involving at least one person, the public safety incident occurring at an incident location;
acquiring historical video of the incident location;
analyzing, by a historical video analysis system implemented on a hardware device, the historical video of the incident location to identify a presence of the at least one person;
analyzing, by the historical video analysis system using behavioral analytics implemented on the hardware device, a behavior of the at least one person in the historical video of the incident location to identify at least one human interaction limitation, wherein the at least one human interaction limitation is any type of limitation that would prevent the at least one person from behaving as would be expected, wherein the historical video is not viewed by a dispatcher, wherein the behavior is not occurring in a real time video of the incident location; and
informing a first responder that is responding to the public safety incident of the at least one human interaction limitation, wherein the first responder alters their response based on the human interaction limitation.

2. The method of claim 1 wherein the human interaction limitation is related to the at least one person's communication abilities.

3. The method of claim 2 wherein the human interaction limitation is at least one of an inebriated person, a hearing impaired person, and an autistic person.

4. The method of claim 1 wherein the human interaction limitation is related to the at least one person's physical movement abilities.

5. The method of claim 1 further comprising;
acquiring historical video of the at least one person taken from a location different from the incident location; and
analyzing the behavior of the at least one person in the historical video of the location different from the incident location to identify at least one human interaction limitation.

6. The method of claim 1 wherein the historical video is limited to a configurable time threshold.

7. The method of claim 6 wherein the threshold is based on a length of time the at least one human interaction limitation is expected to persist.

8. A system comprising:
a processor; and
a memory coupled to the processor, the memory containing a set of instructions thereon that when executed by the processor cause the processor to:
receive an indication of a public safety incident, the public safety incident involving at least one person, the public safety incident occurring at an incident location;
acquire historical video of the incident location;
analyze, by a historical video analysis system implemented on a hardware device, the historical video of the incident location to identify a presence of the at least one person;
analyze, by the historical video analysis system using behavioral analytics implemented on the hardware device, a behavior of the at least one person in the historical video of the incident location to identify at least one human interaction limitation, wherein the at least one human interaction limitation is any type of limitation that would prevent the at least one person from behaving as would be expected, wherein the historical video is not viewed by a dispatcher, wherein the behavior is not occurring in a real time video of the incident location; and
inform a first responder that is responding to the public safety incident of the at least one human interaction limitation, wherein the first responder alters their response based on the human interaction limitation.

9. The system of claim 8 wherein the human interaction limitation is related to the at least one person's communication abilities.

10. The system of claim 9 wherein the human interaction limitation is at least one of an inebriated person, a hearing impaired person, and an autistic person.

11. The system of claim 8 wherein the human interaction limitation is related to the at least one person's physical movement abilities.

12. The system of claim 8 further comprising instructions to;
acquire historical video of the at least one person taken from a location different from the incident location; and
analyze the behavior of the at least one person in the historical video of the location different from the incident location to identify at least one human interaction limitation.

13. The system of claim 8 wherein the historical video is limited to a configurable time threshold.

14. The system of claim 13 wherein the threshold is based on a length of time the at least one human interaction limitation is expected to persist.

15. A non-transitory processor readable medium containing a set of instructions thereon that when executed by a processor cause the processor to:
receive an indication of a public safety incident, the public safety incident involving at least one person, the public safety incident occurring at an incident location;
acquire historical video of the incident location;
analyze, by a historical video analysis system implemented on a hardware device, the historical video of the incident location to identify a presence of the at least one person;

analyze, by the historical video analysis system using behavioral analytics implemented on the hardware device, a behavior of the at least one person in the historical video of the incident location to identify at least one human interaction limitation, wherein the at least one human interaction limitation is any type of limitation that would prevent the at least one person from behaving as would be expected, wherein the historical video is not viewed by a dispatcher, wherein the behavior is not occurring in a real time video of the incident location; and inform a first responder that is responding to the public safety incident of the at least one human interaction limitation, wherein the first responder alters their response based on the human interaction limitation.

16. The non-transitory processor readable medium of claim 15 wherein the human interaction limitation is related to the at least one person's communication abilities.

17. The non-transitory processor readable medium of claim 16 wherein the human interaction limitation is at least one of an inebriated person, a hearing impaired person, and an autistic person.

18. The non-transitory processor readable medium of claim 15 further comprising instructions to;
   acquire historical video of the at least one person taken from a location different from the incident location; and
   analyze the behavior of the at least one person in the historical video of the location different from the incident location to identify at least one human interaction limitation.

19. The non-transitory processor readable medium of claim 15 wherein the historical video is limited to a configurable time threshold.

20. The non-transitory processor readable medium of claim 19 wherein the threshold is based on a length of time the at least one human interaction limitation is expected to persist.

* * * * *